(12) United States Patent
Gardner et al.

(10) Patent No.: US 12,514,549 B2
(45) Date of Patent: Jan. 6, 2026

(54) METHODS AND SYSTEMS FOR EVALUATING ECHO DATA CONTEMPORANEOUS WITH AN ELECTRODIAGNOSTIC STUDY

(71) Applicant: Cadwell Laboratories, Inc., Kennewick, WA (US)

(72) Inventors: Abram Gardner, San Clemente, CA (US); Michal Holub, Jr., Block (SG); John A. Cadwell, Richland, WA (US)

(73) Assignee: Cadwell Laboratories, Inc., Kennewick, WA (US)

( * ) Notice: Subject to any disclaimer, the term of this patent is extended or adjusted under 35 U.S.C. 154(b) by 544 days.

(21) Appl. No.: 17/823,479

(22) Filed: Aug. 30, 2022

(65) Prior Publication Data

US 2023/0119063 A1   Apr. 20, 2023

Related U.S. Application Data

(60) Provisional application No. 63/260,778, filed on Aug. 31, 2021.

(51) Int. Cl.
*A61B 8/00* (2006.01)

(52) U.S. Cl.
CPC ............ *A61B 8/4444* (2013.01); *A61B 8/463* (2013.01)

(58) Field of Classification Search
CPC .............................. A61B 8/4444; A61B 8/463
See application file for complete search history.

(56) References Cited

U.S. PATENT DOCUMENTS

| | | | |
|---|---|---|---|
| 751,475 | A | 2/1904 | De Vilbiss |
| 2,320,709 | A | 6/1943 | Arnesen |
| 2,807,259 | A | 9/1957 | Guerriero |
| 2,950,437 | A | 8/1960 | Stahl |
| 3,165,340 | A | 1/1965 | Kuehl |
| 3,659,250 | A | 4/1972 | Horton |

(Continued)

FOREIGN PATENT DOCUMENTS

| | | |
|---|---|---|
| CN | 104766176 A | 7/2015 |
| DE | 102014008684 A1 | 1/2016 |

(Continued)

OTHER PUBLICATIONS

Aage R. Møller, "Intraoperative Neurophysiologic Monitoring", University of Pittsburgh, School of Medicine Pennsylvania, © 1995 by Harwood Academic Publishers GmbH.

(Continued)

*Primary Examiner* — Chao Sheng
(74) *Attorney, Agent, or Firm* — Novel IP

(57) ABSTRACT

Systems and methods for ultrasound imaging include obtaining RF data using an ultrasound probe and processing the RF data in-parallel to generate B-mode data and echo intensity data during ultrasound examination of a patient. The RF data is analyzed in real-time to provide a user with live ultrasound image and echogenicity analytics. Based on the echogenicity analytics, the user may reposition the ultrasonic probe to adjust and select an optimal probe angle to ensure reproducible results. Providing live RF data allows the user to assess the health of nerves and muscles in real-time and make dynamic decisions on further exams to perform during the same office visit.

20 Claims, 8 Drawing Sheets

(56) References Cited

U.S. PATENT DOCUMENTS

| | | |
|---|---|---|
| 3,682,162 A | 8/1972 | Colyer |
| 3,985,125 A | 10/1976 | Rose |
| 3,993,859 A | 11/1976 | McNeel |
| 4,155,353 A | 5/1979 | Rea |
| 4,262,306 A | 4/1981 | Renner |
| 4,263,899 A | 4/1981 | Burgin |
| 4,545,374 A | 10/1985 | Jacobson |
| 4,562,832 A | 1/1986 | Wilder |
| 4,616,635 A | 10/1986 | Caspar |
| 4,705,049 A | 11/1987 | John |
| 4,716,901 A | 1/1988 | Jackson |
| 4,743,959 A | 5/1988 | Frederiksen |
| 4,765,311 A | 8/1988 | Kulik |
| 4,817,587 A | 4/1989 | Janese |
| 4,862,891 A | 9/1989 | Smith |
| 4,889,502 A | 12/1989 | Althouse |
| 4,914,508 A | 4/1990 | Music |
| 5,107,845 A | 4/1992 | Guern |
| 5,171,279 A | 12/1992 | Mathews |
| 5,196,015 A | 3/1993 | Neubardt |
| 5,284,153 A | 2/1994 | Raymond |
| 5,284,154 A | 2/1994 | Raymond |
| 5,299,563 A | 4/1994 | Seton |
| 5,377,667 A | 1/1995 | Patton |
| 5,438,989 A | 8/1995 | Hochman |
| 5,462,448 A | 10/1995 | Kida |
| 5,472,426 A | 12/1995 | Bonati |
| 5,474,558 A | 12/1995 | Neubardt |
| 5,540,235 A | 7/1996 | Wilson |
| 5,544,286 A | 8/1996 | Laney |
| 5,560,372 A | 10/1996 | Cory |
| 5,565,779 A | 10/1996 | Arakawa |
| 5,578,060 A | 11/1996 | Pohl |
| 5,601,608 A | 2/1997 | Mouchawar |
| 5,602,585 A | 2/1997 | Dickinson |
| 5,625,759 A | 4/1997 | Freeman |
| 5,648,815 A | 7/1997 | Toba |
| 5,664,029 A | 9/1997 | Callahan |
| 5,681,265 A | 10/1997 | Maeda |
| 5,684,887 A | 11/1997 | Lee |
| 5,728,046 A | 3/1998 | Mayer |
| 5,741,261 A | 4/1998 | Moskovitz |
| 5,766,133 A | 6/1998 | Faisandier |
| 5,772,661 A | 6/1998 | Michelson |
| 5,775,331 A | 7/1998 | Raymond |
| 5,775,931 A | 7/1998 | Jones |
| 5,785,648 A | 7/1998 | Min |
| 5,792,044 A | 8/1998 | Foley |
| 5,795,291 A | 8/1998 | Koros |
| 5,830,150 A | 11/1998 | Palmer |
| 5,847,755 A | 12/1998 | Wixson |
| 5,860,973 A | 1/1999 | Michelson |
| 5,868,668 A | 2/1999 | Weiss |
| 5,885,210 A | 3/1999 | Cox |
| 5,891,147 A | 4/1999 | Moskovitz |
| 5,928,139 A | 7/1999 | Koros |
| 5,928,158 A | 7/1999 | Aristides |
| 5,930,379 A | 7/1999 | Rehg |
| 5,931,777 A | 8/1999 | Sava |
| 5,933,929 A | 8/1999 | Kawakami |
| 5,944,658 A | 8/1999 | Koros |
| 5,954,635 A | 9/1999 | Foley |
| 5,993,385 A | 11/1999 | Johnston |
| 6,004,312 A | 12/1999 | Finneran |
| 6,004,341 A | 12/1999 | Zhu |
| 6,026,180 A | 2/2000 | Wittenstein |
| 6,042,540 A | 3/2000 | Johnston |
| 6,062,216 A | 5/2000 | Corn |
| 6,074,343 A | 6/2000 | Nathanson |
| 6,088,878 A | 7/2000 | Antonucci |
| 6,095,987 A | 8/2000 | Shmulewitz |
| 6,109,948 A | 8/2000 | Kuo |
| 6,116,941 A | 9/2000 | Kuo |
| 6,119,306 A | 9/2000 | Antonucci |
| 6,139,493 A | 10/2000 | Koros |
| 6,152,871 A | 11/2000 | Foley |
| 6,181,961 B1 | 1/2001 | Prass |
| 6,196,969 B1 | 3/2001 | Bester |
| 6,200,331 B1 | 3/2001 | Swartz |
| 6,206,826 B1 | 3/2001 | Mathews |
| 6,210,202 B1 | 4/2001 | Kuo |
| 6,224,545 B1 | 5/2001 | Cocchia |
| 6,236,874 B1 | 5/2001 | Devlin |
| 6,241,548 B1 | 6/2001 | Kuo |
| 6,259,945 B1 | 7/2001 | Epstein |
| 6,264,491 B1 | 7/2001 | Lord |
| 6,266,558 B1 | 7/2001 | Gozani |
| 6,273,740 B1 | 8/2001 | Lord |
| 6,287,322 B1 | 9/2001 | Zhu |
| 6,302,842 B1 | 10/2001 | Auerbach |
| 6,306,100 B1 | 10/2001 | Prass |
| 6,309,349 B1 | 10/2001 | Bertolero |
| 6,325,764 B1 | 12/2001 | Griffith |
| 6,334,068 B1 | 12/2001 | Hacker |
| 6,373,890 B1 | 4/2002 | Freeman |
| 6,425,859 B1 | 7/2002 | Foley |
| 6,450,952 B1 | 9/2002 | Rioux |
| 6,466,817 B1 | 10/2002 | Kaula |
| 6,473,639 B1 | 10/2002 | Fischell |
| 6,500,128 B2 | 12/2002 | Marino |
| 6,535,759 B1 | 3/2003 | Epstein |
| 6,579,114 B2 | 6/2003 | Lord |
| 6,609,018 B2 | 8/2003 | Cory |
| 6,712,795 B1 | 3/2004 | Cohen |
| 6,799,931 B2 | 10/2004 | Kwilosz |
| 6,805,668 B1 | 10/2004 | Cadwell |
| 6,837,716 B1 | 1/2005 | Brazas |
| 6,847,849 B2 | 1/2005 | Mamo |
| 6,851,430 B2 | 2/2005 | Tsou |
| 6,869,301 B2 | 3/2005 | Shimizu |
| 6,870,109 B1 | 3/2005 | Villarreal |
| 6,926,728 B2 | 8/2005 | Zucherman |
| 6,945,933 B2 | 9/2005 | Branch |
| 7,072,521 B1 | 7/2006 | Cadwell |
| 7,089,059 B1 | 8/2006 | Pless |
| 7,104,965 B1 | 9/2006 | Jiang |
| 7,177,677 B2 | 2/2007 | Kaula |
| 7,214,197 B2 | 5/2007 | Prass |
| 7,230,688 B1 | 6/2007 | Villarreal |
| 7,261,688 B2 | 8/2007 | Smith |
| 7,374,448 B2 | 5/2008 | Jepsen |
| 7,470,236 B1 | 12/2008 | Kelleher |
| 7,522,953 B2 | 4/2009 | Kaula |
| 7,713,210 B2 | 5/2010 | Byrd |
| 7,801,601 B2 | 9/2010 | Maschino |
| 7,914,350 B1 | 3/2011 | Bozich |
| 7,963,927 B2 | 6/2011 | Kelleher |
| 7,983,761 B2 | 7/2011 | Giuntoli |
| 8,108,039 B2 | 1/2012 | Saliga |
| 8,147,421 B2 | 4/2012 | Farquhar |
| 8,160,694 B2 | 4/2012 | Salmon |
| 8,192,437 B2 | 6/2012 | Simonson |
| D670,656 S | 11/2012 | Jepsen |
| 8,323,208 B2 | 12/2012 | Davis |
| 8,439,703 B2 | 5/2013 | Natoli |
| 8,876,813 B2 | 11/2014 | Min |
| 8,942,797 B2 | 1/2015 | Bartol |
| 8,958,869 B2 | 2/2015 | Kelleher |
| 9,084,551 B2 | 7/2015 | Brunnett |
| 9,138,586 B2 | 9/2015 | Eiger |
| 9,155,503 B2 | 10/2015 | Cadwell |
| 9,295,401 B2 | 3/2016 | Cadwell |
| 9,352,153 B2 | 5/2016 | Van Dijk |
| 9,730,634 B2 | 8/2017 | Cadwell |
| 10,238,467 B2 | 3/2019 | Cadwell |
| 2001/0049510 A1 | 12/2001 | Burr |
| 2002/0007188 A1 | 1/2002 | Arambula |
| 2002/0009916 A1 | 1/2002 | Lord |
| 2002/0088098 A1 | 7/2002 | Bouley |
| 2002/0095080 A1 | 7/2002 | Cory |
| 2003/0045808 A1 | 3/2003 | Kaula |
| 2003/0074033 A1 | 4/2003 | Pless |
| 2004/0030258 A1 | 2/2004 | Williams |
| 2004/0127810 A1 | 7/2004 | Sackellares |

(56) References Cited

U.S. PATENT DOCUMENTS

| | | |
|---|---|---|
| 2004/0192100 A1 | 9/2004 | Shimizu |
| 2005/0003682 A1 | 1/2005 | Brazas |
| 2005/0075578 A1 | 4/2005 | Gharib |
| 2005/0085743 A1 | 4/2005 | Hacker |
| 2005/0148927 A1 | 7/2005 | Ludin |
| 2005/0182454 A1 | 8/2005 | Gharib |
| 2005/0182456 A1 | 8/2005 | Ziobro |
| 2005/0277844 A1 | 12/2005 | Strother |
| 2006/0009754 A1 | 1/2006 | Boese |
| 2006/0085048 A1 | 4/2006 | Cory |
| 2006/0085049 A1 | 4/2006 | Cory |
| 2006/0122514 A1 | 6/2006 | Byrd |
| 2006/0135877 A1 | 6/2006 | Giftakis |
| 2006/0258951 A1 | 11/2006 | Bleich |
| 2006/0276720 A1 | 12/2006 | McGinnis |
| 2007/0016097 A1 | 1/2007 | Farquhar |
| 2007/0021682 A1 | 1/2007 | Gharib |
| 2007/0032841 A1 | 2/2007 | Urmey |
| 2007/0046471 A1 | 3/2007 | Nyalamadugu |
| 2007/0049962 A1 | 3/2007 | Marino |
| 2007/0184422 A1 | 8/2007 | Takahashi |
| 2007/0202005 A1 | 8/2007 | Maschke |
| 2008/0027507 A1 | 1/2008 | Bijelic |
| 2008/0058606 A1 | 3/2008 | Miles |
| 2008/0065144 A1 | 3/2008 | Marino |
| 2008/0071191 A1 | 3/2008 | Kelleher |
| 2008/0082136 A1 | 4/2008 | Gaudiani |
| 2008/0097164 A1 | 4/2008 | Miles |
| 2008/0108244 A1 | 5/2008 | Jepsen |
| 2008/0167574 A1 | 7/2008 | Farquhar |
| 2008/0183096 A1 | 7/2008 | Snyder |
| 2008/0194970 A1 | 8/2008 | Steers |
| 2008/0269777 A1 | 10/2008 | Appenrodt |
| 2008/0281313 A1 | 11/2008 | Fagin |
| 2008/0312520 A1 | 12/2008 | Rowlandson |
| 2009/0018399 A1 | 1/2009 | Martinelli |
| 2009/0043221 A1 | 2/2009 | Kaplan |
| 2009/0088660 A1 | 4/2009 | McMorrow |
| 2009/0105604 A1 | 4/2009 | Bertagnoli |
| 2009/0177112 A1 | 7/2009 | Gharib |
| 2009/0196471 A1 | 8/2009 | Goetz |
| 2009/0204016 A1 | 8/2009 | Gharib |
| 2009/0209879 A1 | 8/2009 | Kaula |
| 2009/0259108 A1 | 10/2009 | Miles |
| 2009/0279767 A1 | 11/2009 | Kukuk |
| 2010/0036384 A1 | 2/2010 | Gorek |
| 2010/0106011 A1 | 4/2010 | Byrd |
| 2010/0113898 A1 | 5/2010 | Kim |
| 2010/0152604 A1 | 6/2010 | Kaula |
| 2010/0168603 A1 | 7/2010 | Himes |
| 2010/0191305 A1 | 7/2010 | Imran |
| 2010/0249638 A1 | 9/2010 | Liley |
| 2010/0286554 A1 | 11/2010 | Davis |
| 2010/0317931 A1 | 12/2010 | Sarkela |
| 2010/0317989 A1 | 12/2010 | Gharib |
| 2011/0082383 A1 | 4/2011 | Cory |
| 2011/0184308 A1 | 7/2011 | Kaula |
| 2011/0295579 A1 | 12/2011 | Tang |
| 2011/0313530 A1 | 12/2011 | Gharib |
| 2012/0003862 A1 | 1/2012 | Newman |
| 2012/0046531 A1 | 2/2012 | Hua |
| 2012/0071779 A1 | 3/2012 | Sarkela |
| 2012/0109000 A1 | 5/2012 | Kaula |
| 2012/0109004 A1 | 5/2012 | Cadwell |
| 2012/0116218 A1* | 5/2012 | Martin ............... A61B 8/4427 600/437 |
| 2012/0209082 A1 | 8/2012 | Al-Ali |
| 2012/0209346 A1 | 8/2012 | Bikson |
| 2012/0220891 A1 | 8/2012 | Kaula |
| 2012/0238855 A1 | 9/2012 | Lanning |
| 2012/0238893 A1 | 9/2012 | Farquhar |
| 2012/0265040 A1 | 10/2012 | Ito |
| 2012/0296230 A1 | 11/2012 | Davis |
| 2013/0012880 A1 | 1/2013 | Blomquist |
| 2013/0109996 A1 | 5/2013 | Turnbull |
| 2013/0138010 A1 | 5/2013 | Nierenberg |
| 2013/0152657 A1 | 6/2013 | Swinehart |
| 2013/0204315 A1 | 8/2013 | Wongsarnpigoon |
| 2013/0245463 A1 | 9/2013 | Stuebe |
| 2013/0253447 A1 | 9/2013 | Ball |
| 2013/0253611 A1 | 9/2013 | Lee |
| 2013/0303933 A1 | 11/2013 | Bonnstetter |
| 2013/0304407 A1 | 11/2013 | George |
| 2014/0121555 A1 | 5/2014 | Scott |
| 2014/0275926 A1 | 9/2014 | Scott |
| 2014/0276181 A1 | 9/2014 | Sun |
| 2014/0276925 A1 | 9/2014 | Alves |
| 2015/0150512 A1 | 6/2015 | Warner |
| 2015/0227702 A1 | 8/2015 | Krishna |
| 2015/0230749 A1 | 8/2015 | Gharib |
| 2015/0238106 A1 | 8/2015 | Lappalainen |
| 2015/0351643 A1 | 12/2015 | Edwards |
| 2015/0372433 A1 | 12/2015 | Lisogurski |
| 2016/0000382 A1 | 1/2016 | Jain |
| 2016/0074015 A1* | 3/2016 | Eda .................. A61B 8/5269 600/443 |
| 2016/0174861 A1 | 6/2016 | Cadwell |
| 2016/0270679 A1 | 9/2016 | Mahon |
| 2016/0328991 A1 | 11/2016 | Simpson |
| 2017/0056663 A1 | 3/2017 | Kaemmerer |
| 2017/0100047 A1 | 4/2017 | Edwards |
| 2018/0117309 A1 | 5/2018 | Rapoport |
| 2018/0140829 A1 | 5/2018 | Ramos De Miguel, Sr. |
| 2018/0161123 A1 | 6/2018 | Cadwell |
| 2018/0198218 A1 | 7/2018 | Regan |
| 2018/0256097 A1 | 9/2018 | Bray |
| 2018/0296277 A1 | 10/2018 | Schwartz |
| 2019/0190187 A1 | 6/2019 | Fukazawa |
| 2020/0022603 A1 | 1/2020 | Cardenas |
| 2020/0108246 A1 | 4/2020 | Cadwell |
| 2020/0297282 A1 | 9/2020 | Batzer |
| 2020/0330772 A1 | 10/2020 | Hartmann-Bax |

FOREIGN PATENT DOCUMENTS

| | | | |
|---|---|---|---|
| EP | 298268 | | 1/1989 |
| EP | 0863719 | A1 | 9/1998 |
| EP | 890341 | | 1/1999 |
| EP | 972538 | | 1/2000 |
| EP | 1182965 | B1 | 3/2002 |
| EP | 2173238 | A2 | 4/2010 |
| JP | H11513592 | A | 11/1999 |
| JP | 2007330764 | A * | 12/2007 ............. A61B 8/469 |
| JP | 2008546509 | A | 12/2008 |
| WO | 2000038574 | A1 | 7/2000 |
| WO | 2000066217 | A1 | 11/2000 |
| WO | 2001037728 | A1 | 5/2001 |
| WO | 2003005887 | A2 | 1/2003 |
| WO | 2005030318 | A1 | 4/2005 |
| WO | 2006042241 | A2 | 4/2006 |
| WO | 2016028822 | A1 | 2/2016 |
| WO | 2016105571 | A1 | 6/2016 |

OTHER PUBLICATIONS

Clements, et. al., "Evoked and Spontaneous Electromyography to Evaluate Lumbosacral Pedicle Screw Placement", 21 (5):600-604 (1996).

Danesh-Clough, et. al., "The Use of Evoked EMG in Detecting Misplaced Thoracolumbar Pedicle Screws", 26(12):1313-1316 (2001).

Dezawa et al., "Retroperitoneal Laparoscopic Lateral Approach to the Lumbar Spine: A New Approach, Technique, and Clinical Trial", Journal of Spinal Disorders 13(2):138-143 (2000).

Dickman, et al., "Techniques in Neurosurgery", National Library of Medicine, 3 (4) 301-307 (1997).

Epstein, et al., "Evaluation of Intraoperative Somatosensory-Evoked Potential Monitoring During 100 Cervical Operations", 18(6):737-747 (1993), J.B. Lippincott Company.

Glassman, et. al., "A Prospective Analysis of Intraoperative Electromyographic Monitoring of Pedicle Screw Placement with Computed Tomography Scan Confirmation", 20(12):1375-1379.

(56) References Cited

OTHER PUBLICATIONS

Goldstein, et. al., "Minimally Invasive Endoscopic Surgery of the Lumbar Spine", Operative Techniques in Orthopaedics, 7 (1):27-35 (1997).
Greenblatt, et. al., "Needle Nerve Stimulator-Locator", 41 (5):599-602 (1962).
H.M. Mayer, "Minimally Invasive Spine Surgery, A Surgical Manual", Chapter 12, pp. 117-131 (2000).
Hinrichs, et al., "A trend-detection algorithm for intraoperative EEG monitoring", Med. Eng. Phys. 18 (8):626-631 (1996).
Bergey et al., "Endoscopic Lateral Transpsoas Approach to the Lumbar Spine", SPINE 29 (15):1681-1688 (2004).
Holland, "Spine Update, Intraoperative Electromyography During Thoracolumbar Spinal Surgery", 23 (17):1915-1922 (1998).
Holland, et al., "Continuous Electromyographic Monitoring to Detect Nerve Root Injury During Thoracolumbar Scoliosis Surgery", 22 (21):2547-2550 (1997), Lippincott-Raven Publishers.
Hovey, A Guide to Motor Nerve Monitoring, pp. 1-31, Mar. 20, 1998, The Magstim Company Limited.
Kevin T. Foley, et al., "Microendoscipic Discectomy" Techniques in Neurosurgery, 3:(4):301-307, © 1997 Lippincott-Raven Publishers, Philadelphia.
Kossmann et al., "The use of a retractor system (SynFrame) for open, minimal invasive reconstruction of the anterior column of the thoracic and lumbar spine", 10:396-402 (2001).
Kossmann, et. al., "Minimally Invasive Vertebral Replacement with Cages in Thoracic and Lumbar Spine", European Journal of Trauma, 2001, No. 6, pp. 292-300.
Lenke, et. al., "Triggered Electromyographic Threshold for Accuracy of Pedicle Screw Placement, An Animal Model and Clinical Correlation", 20 (14):1585-1591 (1995).
Lomanto et al., "7th World Congress of Endoscopic Surgery" Singapore, Jun. 1-4, 2000 Monduzzi Editore S.p.A.; email: monduzzi@monduzzi.com, pp. 97-103 and 105-111.
MaGuire, et. al., "Evaluation of Intrapedicular Screw Position Using Intraoperative Evoked Electromyography", 20 (9):1068-1074 (1995).
Mathews et al., "Laparoscopic Discectomy With Anterior Lumbar Interbody Fusion, A Preliminary Review", 20 (16):1797-1802, (1995), Lippincott-Raven Publishers.
Bertagnoli, et. al., "The AnteroLateral transPsoatic Approach (ALPA), A New Technique for Implanting Prosthetic Disc-Nucleus Devices", 16 (4):398-404 (2003).
Michael R. Isley, et. al., "Recent Advances in Intraoperative Neuromonitoring of Spinal Cord Function: Pedicle Screw Stimulation Techniques", Am. J. End Technol. 37:93-126 (1997).
Minahan, et. al., "The Effect of Neuromuscular Blockade on Pedicle Screw Stimulation Thresholds" 25(19):2526-2530 (2000).
Pimenta et. al., "Implante de prótese de núcleo pulposo: análise inicial", J Bras Neurocirurg 12 (2):93-96, (2001).
Raymond J. Gardocki, MD, "Tubular diskectomy minimizes collateral damage", AAOS Now, Sep. 2009 Issue, http://www.aaos.org/news/aaosnow/sep09/clinical12.asp.
Raymond, et. al., "The NerveSeeker: A System for Automated Nerve Localization", Regional Anesthesia 17:151-162 (1992).
Reidy, et. al., "Evaluation of electromyographic monitoring during insertion of thoracic pedicle screws", British Editorial Society of Bone and Joint Surgery 83 (7):1009-1014, (2001).
Rose et al., "Persistently Electrified Pedicle Stimulation Instruments in Spinal Instrumentation: Technique and Protocol Development", Spine: 22(3): 334-343 (1997).
Teresa Riordan "Patents; A businessman invents a device to give laparoscopic surgeons a better view of their work", New York Times www.nytimes.com/2004/29/business/patents-businessman-invents-device-give-la (Mar. 2004).
Toleikis, et. al., "The usefulness of Electrical Stimulation for Assessing Pedicle Screw Placements", Journal of Spinal Disorders, 13 (4):283-289 (2000).

U.Schick, et. al., "Microendoscopic lumbar discectomy versus open surgery: an intraoperative EMG study", pp. 20-26, Published online: Jul. 31, 2001 © Springer-Verlag 2001.
Bose, et. al., "Neurophysiologic Monitoring of Spinal Nerve Root Function During Instrumented Posterior Lumbar Spine Surgery", 27 (13):1440-1450 (2002).
Vaccaro, et. al., "Principles and Practice of Spine Surgery", Mosby, Inc. © 2003, Chapter 21, pp. 275-281.
Vincent C. Traynelis, "Spinal arthroplasty", Neurosurg Focus 13 (2):1-7. Article 10, (2002).
Welch, et. al., "Evaluation with evoked and spontaneous electromyography during lumbar instrumentation: a prospective study", J Neurosurg 87:397-402, (1997).
Zouridakis, et. al., "A Concise Guide to Intraoperative Monitoring", Library of Congress card No. 00-046750, Chapter 3, p. 21, chapter 4, p. 58 and chapter 7 pp. 119-120.
Medtronic, "Nerve Integrity Monitor, Intraoperative EMG Monitor, User's Guide", Medtronic Xomed U.K. Ltd., Unit 5, West Point Row, Great Park Road, Almondsbury, Bristol B5324QG, England, pp. 1-39.
Chapter 9, "Root Finding and Nonlinear Sets of Equations", Chapter 9:350-354, http://www.nr.com.
Digitimer Ltd., 37 Hydeway, Welwyn Garden City, Hertfordshire. AL7 3BE England, email:sales@digitimer.com, website: www.digitimer.com, "Constant Current High Voltage Stimulator, Model DS7A, For Percutaneous Stimulation of Nerve and Muscle Tissue".
Ford et al., 'Electrical characteristics of peripheral nerve stimulators, implications for nerve localization, Dept. of Anesthesia, University of Cincinnati College of Medicine, Cincinnati, OH 45267, pp. 73-77.
Deletis et al., "The role of intraoperative neurophysiology in the protection or documentation of surgically induced injury to the spinal cord", Correspondence Address: Hyman Newman Institute for Neurology & Neurosurgery, Beth Israel Medical Center, 170 East End Ave., Room 311, NY 10128.
Urmey "Using the nerve stimulator for peripheral or plexus nerve blocks" Minerva Anesthesiology 2006; 72:467-71.
Butterworth et. al., "Effects of Halothane and Enflurane on Firing Threshold of Frog Myelinated Axon", Journal of Physiology 411:493-516, (1989) From the Anesthesia Research Labs, Brigham and Women's Hospital, Harvard Medical School, 75 Francis St., Boston, MA 02115, jp.physoc.org.
Calancie, et. al., "Threshold-level multipulse transcranial electrical stimulation of motor cortex for intraoperative monitoring of spinal motor tracts: description of method and comparison to somatosensory evoked potential monitoring" J Neurosurg 88:457-470 (1998).
Calancie, et. al., "Threshold-level repetitive transcranial electrical stimulation for intraoperative monitoring of central motor conduction", J. Neurosurg 95:161-168 (2001).
Calancie, et. al., Stimulus-Evoked EMG Monitoring During Transpedicular Lumbosacral Spine Instrumentation, Initial Clinical Results, 19 (24):2780-2786 (1994).
Carl T. Brighton, "Clinical Orthopaedics and Related Research", Clinical Orthopaedics and related research No. 384, pp. 82-100 (2001).
International Search Report for PCT/US2019/063793, Feb. 19, 2020.
International Search Report for PCT/US2017/062559, Jan. 26, 2018.
Brainstorm Website, http://neuroimage.usc.edu/brainstorm/ accessed online Oct. 9, 2021, available online Apr. 11, 2018. (Year: 2018).
Compumedics Website, "Compumedics Profusion EEG 4" accessed online Oct. 9, 2021, available online Feb. 23, 2017 (ttps://www.compumedics.com.au/wp-content/uploads/2016/08/AD125-02-Profusion-EEG4-brochureLR.pdf (Year:2017).
Intelimed Website, "Compumedics Profusion EEG 5 Top Features" accessed online Oct. 9, 2021, available online Sep. 30, 2014 2014).
Deff Corporation, No more confusion about which direction to plug in. A USB cable that can be plugged in both ways is now available. A connector is equipped with an LED indicator to check a charging status of a smartphone. Nov. 6, 2015 (Dec. 28, 2021 Search) Internet URL:https://deff.co.jp/news/dca-mbled (Document showing known technology).

(56) References Cited

OTHER PUBLICATIONS

"Long, S; "Phase Locked Loop Circuits", Apr. 27, 2005". (Year: 2005).
Brainstorm website, https://web.archive.org/web/20180421074035/https://neuroimage.usc.edu/brainstorm/Tutorials/MontageEditor, available online Apr. 21, 2018 (Year: 2018).
Brainstorm website, https://web.archive.org/web/20180330235454/http://neuroimage.usc.edu/brainstorm/Tutorials/CreateProtocol,) available on Mar. 30, 2018 (Year: 2018).
Brainstorm website,https://web.archive.org/web/20180416072211/http://neuroimage.usc.edu/brainstorm/Screenshots ,available on Apr. 16, 2018 (Year: 2018).
Brainstorm website,https://web.archive.org/web/20180505021718/https://neuroimage.usc.edu/brainstorm/Tutorials/Epileptogenicity, available on May 5, 2018 (Year: 2018).

\* cited by examiner

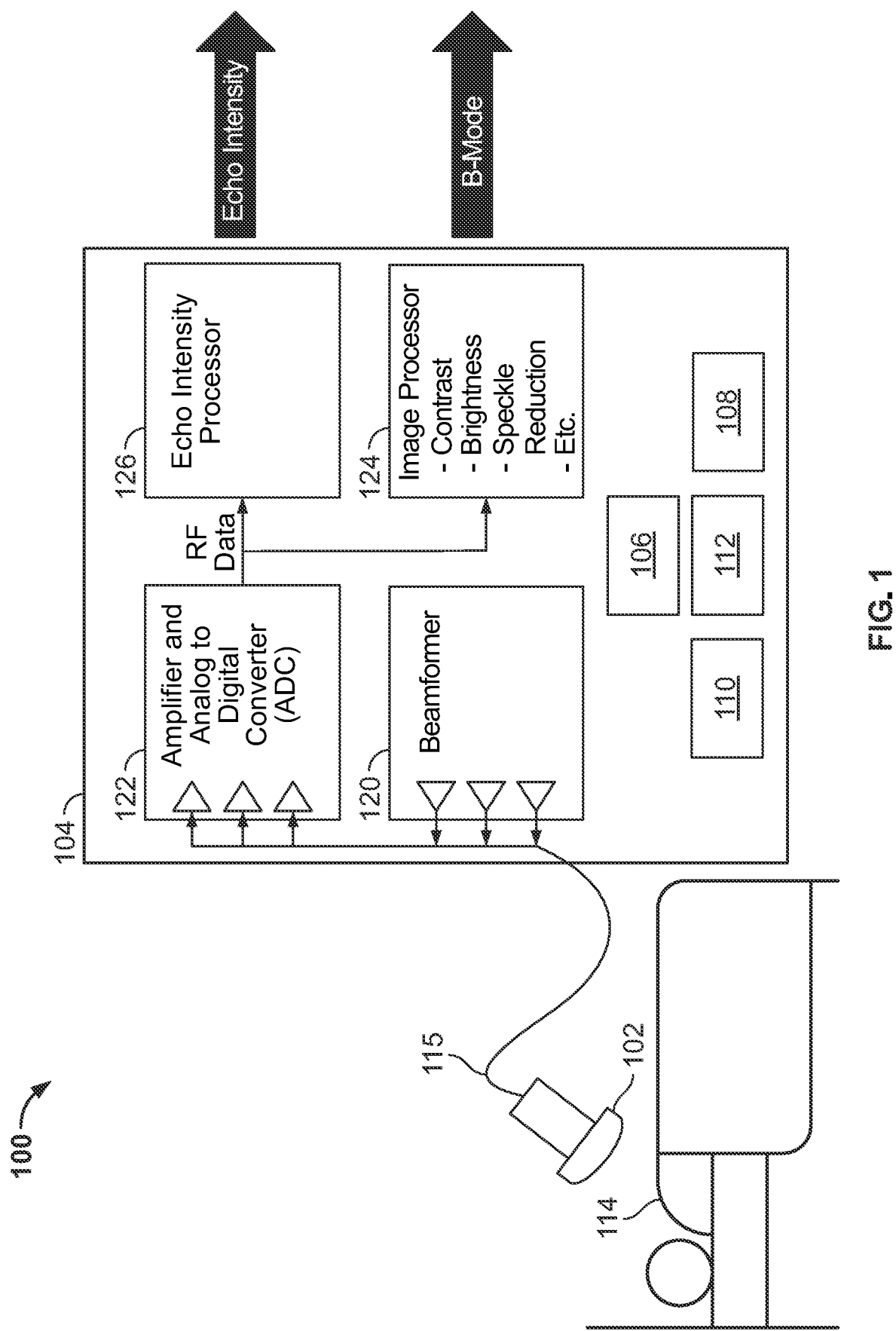

METHODS AND SYSTEMS FOR EVALUATING ECHO DATA CONTEMPORANEOUS WITH AN ELECTRODIAGNOSTIC STUDY

CROSS-REFERENCE

The present application relies on U.S. Patent Provisional Application No. 63/260,778, titled "Quantified Evaluation of Echo Intensity Contemporaneous with an Electrodiagnostic Study", and filed on Aug. 31, 2021, for priority, which is herein incorporated by reference in its entirety.

FIELD

The present specification relates to the field of ultrasound imaging. Specifically, embodiments of the present specification relate to the generation and use of echo intensity data in clinical assessments of muscles and nerves in real-time during an ultrasound examination of a patient.

BACKGROUND

Medical ultrasound imaging is a diagnostic imaging technique that directs acoustic waves toward body structures and detects reflections of those acoustic waves to create images of those body structures, such as tendons, muscles, and blood vessels. More specifically, the images are generated by sending ultrasound pulses into the body of a patient using an ultrasound probe. The ultrasound pulses echo off of (or are reflected from) the tissues near the probe site. The reflected pulses are recorded by the probe and can be processed and displayed as different types of images.

A common image type that is formed from ultrasound imaging technique is known as B-mode image, where represents Brightness. B-Mode is a well-known ultrasound term where a two-dimensional (2D) image is generated and represents a presentation of the amount of reflected sound from each point of the image. This image is filtered and/or manipulated in different ways to enhance specific features of the image, such as contrast, speckle reduction, and edge enhancement. The image is generated based on the time taken from when the ultrasound was transmitted to the time for an echo to be received and the strength of the echo. Based on these parameters, a software program executing in the ultrasonic scanner is adapted to locate which pixel to illuminate and with what intensity. For a grayscale image, white may represent a strong echo, black may represent a weak echo, and varying shades of grey may represent values in between. Echo intensity is the mean pixel intensity of a specific region of interest in an ultrasound image.

Clinicians use ultrasound imaging to examine nerves and muscles and can by looking at the images access information about different types of pathologies and disease processes like muscle atrophy, inflammation or compression of nerves etc.

The generated ultrasound images are suitable for visual inspection and analysis but are, due to the data processing required to create these images, not optimal for extracting and quantifying the actual Echo Intensity (EI) reflected from the different anatomical structures. Clinicians currently interested in measuring the EI must export the ultrasound images and use some external imaging software to analyze and quantify the greyscale images. This is a very slow and tedious process that provides results with low accuracy and only after the examination has been concluded. The clinician has no information during the examination that can help in adjusting probe angle, position etc. to optimize the EI measurement.

Therefore, there is a need to address the aforementioned issues to improve patient care and generate more accurate clinical information and diagnoses. There is a need to improve patient care by giving immediate results as well as live feedback to the clinician so that probe angle and pressure can be optimized and thereby offer a more complete and timely investigation. There is also a need to improve the quality and reproducibility of data collected so that accurate reference values can be obtained from a patient population. There is a further need to lower the barriers to entry for tissue quantifications by making the procedure easier to accomplish with less equipment in a much shorter amount of time.

SUMMARY

The following embodiments and aspects thereof are described and illustrated in conjunction with systems, tools and methods, which are meant to be exemplary and illustrative, and not limiting in scope. The present application discloses numerous embodiments.

The present specification discloses a computer-implemented method for conducting an ultrasound scan of a patient, the method being implemented in a computer having a processor and a random access memory, wherein the processor is in data communication with an ultrasound probe, a display and a storage unit and is configured to execute a plurality of programmatic instructions, the method comprising: receiving RF signals from the ultrasound probe; generating digital RF data from the received RF signals; during the ultrasound scan of the patient, generating B-mode data by processing the digital RF data; in parallel to generating the B-mode data, generating echo intensity data by processing the digital RF data; generating analytical data based on the B-mode data and the echo intensity data; and generating at least one graphical interface to present display data, wherein the display data comprises at least one of the analytical data, B-mode data, or a region of interest.

Optionally, the method further comprises measuring the echo intensity data at a customizable frequency.

Optionally, the at least one graphical interface has a first window that displays one or more anatomies of the patient for which the ultrasound scan is performed. Optionally, the method further comprises enabling a user to select an anatomy from the one or more anatomies and wherein, upon selecting said anatomy, causing an ultrasound image corresponding to the selected anatomy to be displayed in a second window of the at least one graphical interface. Optionally, the method further comprises enabling a user to mark the region of interest on the at least one graphical interface using a graphical marking tool integrated into the at least one graphical interface. Optionally, the method further comprises enabling the user to adjust the region of interest to encompass a portion within the display data, wherein the portion has a maximum value of the echo intensity data.

Optionally, the method further comprises presenting the echo intensity data both numerically and graphically in the at least one graphical interface.

Optionally, the method further comprises storing the RF data in a numerical array and processing the echo intensity data directly from the numerical array to generate average, mean and/or median values.

Optionally, the method further comprises presenting the echo intensity data in the at least one graphical interface as an icon or in the form of a graph.

Optionally, the method further comprises enabling a user to adjust an angle and/or position of the ultrasound probe in order to optimize the display data.

Optionally, the at least one graphical interface comprises a third window, wherein the third window is configured to display a plurality of table and graph data structures. Optionally, the table data structure displays a mean echo intensity value for the region of interest, a depth from a surface of the patient's skin to the region of interest and a thickness of an anatomy. Optionally, the graph data structure displays at least one of a minimum, maximum, mean, median or standard deviation of the echo intensity corresponding to the region of interest.

The present specification also discloses a system for evaluating one or more ultrasound scans of a patient, wherein the system includes a computer having a processor and a random access memory, wherein the processor is in data communication with an ultrasound probe, a display and a storage unit, and wherein the storage unit stores a plurality of programmatic instructions which when executed by the processor cause the processor to: receive RF signals from the ultrasound probe; generate digital RF data from the received RF signals; during the ultrasound scan of the patient, generate B-mode data by processing the digital RF data; in parallel to generating the B-mode data, generate echo intensity data by processing the digital RF data; generate analytical data based on the B-mode data and the echo intensity data; and generate at least one graphical interface to present display data, wherein the display data comprises at least one of the analytical data, B-mode data, or a region of interest.

Optionally, the echo intensity data is measured at a customizable frequency.

Optionally, the at least one graphical interface has a first window that displays one or more anatomies for which ultrasound scans were performed. Optionally, selecting of an anatomy from the one or more anatomies causes an ultrasound image corresponding to the selected anatomy to be displayed in a second window of the at least one graphical interface. Optionally, the region of interest is marked by the user on the ultrasound image using a graphical marking tool integrated into the at least one graphical interface. Optionally, the region of interest is adjusted to encompass a portion within the ultrasound image, wherein the portion has a maximum value of the echo intensity data.

Optionally, the echo intensity data is presented numerically and graphically in the at least one graphical interface.

Optionally, the echo intensity data is processed directly from the numerical array to generate average, mean and/or median values.

Optionally, the echo intensity data is presented in the at least one graphical interface as an icon.

Optionally, the echo intensity data is presented in the at least one graphical interface in the form of a graph.

Optionally, the at least one graphical interface has a third window of options, wherein the options include table and graph data structures. Optionally, the table data structure displays a mean echo intensity value for the region of interest, a depth from surface of patient's skin to the region of interest and thickness of an anatomy. Optionally, the graph data structure displays at least one of a minimum, maximum, mean, media or standard deviation of the echo intensity corresponding to the region of interest.

The present specification also discloses a computer-implemented method for evaluating one or more ultrasound scans of a patient, the method being implemented in a computer having a processor and a random access memory, wherein the processor is in data communication with an ultrasound probe, a display and a storage unit and is configured to execute a plurality of programmatic instructions, the method comprising: receiving RF signals from the ultrasound probe; generating digital RF data from the received RF signals; during the ultrasound scan of the patient, generating B-mode data by processing the digital RF data; in parallel to generating the B-mode data, generating echo intensity data by processing the digital RF data; generating analytical data based on the B-mode data and the echo intensity data; and generating at least one graphical interface to present display data, wherein the display data comprises at least one of the analytical data, B-mode data and/or a region of interest; wherein the region of interest is marked by the user on an ultrasound image corresponding to the B-mode data using a graphical marking tool integrated into the at least one graphical interface, wherein the region of interest is adjusted to encompass a portion within the ultrasound image, and wherein the portion has a maximum value of the echo intensity data.

In embodiments, the present specification discloses a computer-implemented method for evaluating ultrasound data during an ultrasound scan, the method being implemented in a computer having a processor and a random access memory, wherein the processor is in data communication with an ultrasound probe, a display and with a storage unit and is configured to execute a plurality of programmatic instructions, the method comprising: using a Beamformer to generate different sound pulses; receiving, by the computer, B-mode data from the ultrasound probe; receiving, by the computer, RF data from the ultrasound probe; analyzing, by the computer, the B-mode and RF data; determining, by the computer, echo intensity data using the B-mode data and the RF data; assigning the echo intensity data to one or more points on a graph; and visually displaying the graph and a visual representation of the one or more points on said graph indicative of the echo intensity data.

In some embodiments, the present specification discloses a system configured to evaluate ultrasound data during an ultrasound scan, comprising: a computer having a processor and a random access memory; a display; a storage unit; an ultrasound probe, wherein the processor is in data communication with the ultrasound probe, the display and the storage unit, wherein the computer is configured to execute a plurality of programmatic instructions stored at least partially in the random access memory and wherein, upon execution, the computer: receives B-mode data from the ultrasound probe; receives RF data from the ultrasound probe; analyzes the B-mode and RF data; determines echo intensity data using the B-mode data and the RF data; assigns the echo intensity data to one or more points on a graph; and visually displays the graph and a visual representation of the one or more points on said graph indicative of the echo intensity data.

In some embodiments, the present specification discloses a computer-implemented method for evaluating ultrasound data during an ultrasound scan, the method being implemented in a computer having a processor and a random access memory, wherein the processor is in data communication with an ultrasound probe, a display and with a storage unit and is configured to execute a plurality of programmatic instructions, the method comprising: receiving, by the computer, B-mode data from the ultrasound probe; receiving, by the computer, RF data from the ultrasound probe; analyzing, by the computer, the B-mode and RF data; determining, by the computer, echo intensity data using the B-mode data and the RF data; assigning the echo intensity data to one or more points on a scale; and visually displaying the scale and a visual representation of the one or more points on said scale indicative of the echo intensity data.

In some embodiments, the present specification discloses a system configured to evaluate ultrasound data during an ultrasound scan, comprising: a computer having a processor and a random access memory; a display; a storage unit; an ultrasound probe, wherein the processor is in data communication with the ultrasound probe, the display and the storage unit, wherein the computer is configured to execute a plurality of programmatic instructions stored at least partially in the random access memory and wherein, upon execution, the computer: receives B-mode data from the ultrasound probe; receives RF data from the ultrasound probe; analyzes the B-mode and RF data; determines echo intensity data using the B-mode data and the RF data; assigns the echo intensity data to one or more points on a scale; and visually displays the scale and a visual representation of the one or more points on said scale indicative of the echo intensity data.

The aforementioned and other embodiments of the present specification shall be described in greater depth in the drawings and detailed description provided below.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 1 is a diagram of an exemplary environment in which systems of the embodiments of the present specification may be implemented;

DETAILED DESCRIPTION

Figure 2A:
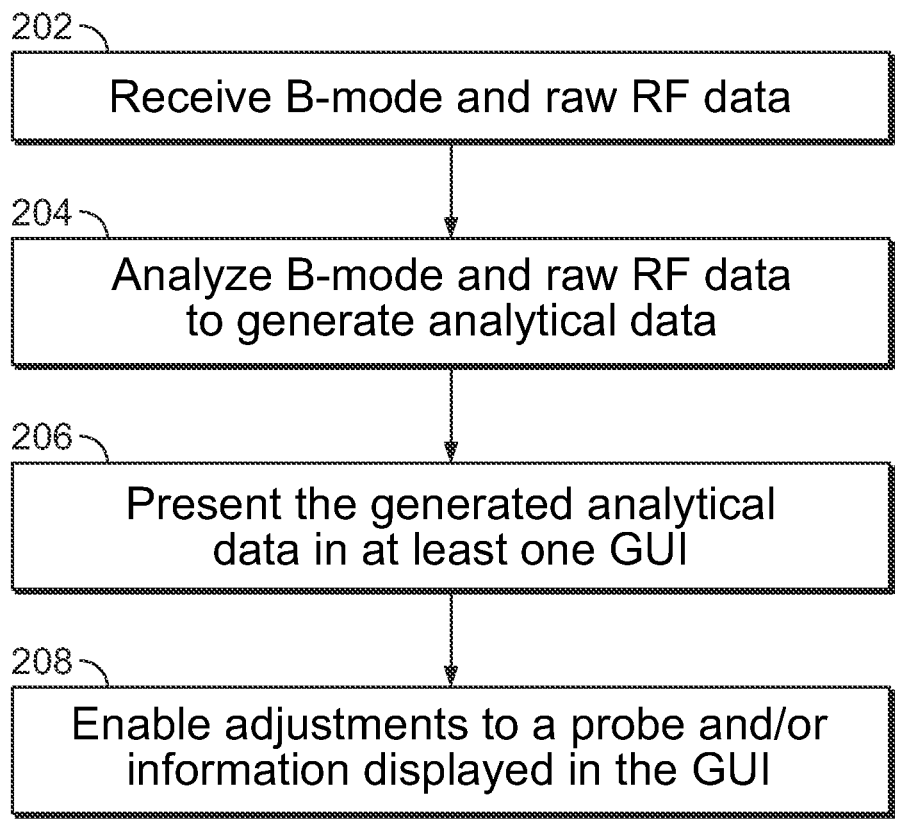
FIG. 2A is a flow chart illustrating an exemplary process for generating analytical data corresponding to an ultrasound examination of a patient, in accordance with some embodiments of the present specification.

The present specification is directed toward methods and systems of ultrasound imaging configured to use an ultrasound scanner to receive B-mode images and RF data during an ultrasound scan and to use the received data to generate graphical and numerical analytics. In embodiments, the RF data is analyzed in real time to determine absolute maxima, minima and other attributes as the probe angle and pressure change. The results of this analysis can be displayed in real time in a separate waveform. Quantitative analysis and generation of the RF signal is performed in an optimal and standardized manner, such as for example, when the RF signal has maximum amplitude and maximum level changes. The analyses are displayed on a display device and enables a user, such as a physician or a clinician, to optimize an angle of a probe of the scanner and position the probe for accurate and reproducible data to optimize clinical information and utility. Embodiments of the present specification offer live, quantifiable results, that are compensated for probe type, depth, and tissue, during an ultrasound examination without the need for post processing. The user (physician/clinician/any other) is able to dynamically adjust the examination process based on the live results. Therefore, embodiments of the present specification offer a more robust clinical information in a single examination.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

In the description and claims of the application, each of the words "comprise", "include", "have", "contain", and forms thereof, are not necessarily limited to members in a list with which the words may be associated. Thus, they are intended to be equivalent in meaning and be open-ended in that an item or items following any one of these words is not meant to be an exhaustive listing of such item or items, or meant to be limited to only the listed item or items. It should be noted herein that any feature or component described in association with a specific embodiment may be used and implemented with any other embodiment unless clearly indicated otherwise.

It must also be noted that as used herein and in the appended claims, the singular forms "a," "an," and "the" include plural references unless the context dictates otherwise. Although any systems and methods similar or equivalent to those described herein can be used in the practice or testing of embodiments of the present disclosure, the preferred systems and methods are now described.

The term "real-time" shall mean the generation of an output at substantially the same time when a measurement is taken such that a user can receive feedback as the user takes the measurement. For example, a real-time feedback scenario may provide a user with an output within 1 minute, preferably within 45 seconds, preferably within 30 seconds, preferably within 15 seconds, and more preferably within 5 seconds, of taking a measurement.

The term "RF data" refers to unprocessed Radio Frequency (RF) data as it is received by an ultrasound probe. RF data is the data without (or with minimal) modification, filtering, and/or compression, making it independent from, and/or unaffected by, user-adjustable settings like brightness and contrast.

The term "echo intensity" refers to a measure of a the RF data representing the amount of reflected sound wave from a specific point in a tissue.

The terms "B-mode", "B-mode data" "ultrasound image" or "image" are used interchangeably and refer to a two-dimensional ultrasound image display composed of bright dots representing the ultrasound echo intensity and is data that has been processed such that it is dependent on, and/or affected by, user-adjustable settings like brightness and contrast. The brightness of each dot is determined by the amplitude or energy of the returned echo signal.

FIG. 1 is an exemplary environment in which methods and systems of the embodiments of the present specification may be implemented. Accordingly, an ultrasound scanning system or scanner 100 includes an ultrasound probe 102 that is connected to a computing device 104. Probe 102 is connected by a wire 115, or wirelessly, to the computing device 104. The probe 102 includes a plurality of piezoelectric elements that can both generate as well as record mechanical vibrations (sound). In some embodiments, the computing device 104 includes a beamformer 120 that is configured to generate different types of very short vibrations/sound waves (pulses) that are propagated through the body via the ultrasound probe 102. The resulting reflected vibrations/sound waves are acquired by the same ultrasound probe 102 and recorded and digitized by an amplifier and digital converter 122. The digitized data output from the amplifier and digital converter 122 is referred to as Radio Frequency (RF) data. In some embodiments, The RF data has a high resolution both in amplitude (12-24 bits) and in time (MHz sampling frequency).

In accordance with some aspects of the present specification, the RF data is processed, by at least one processor 106 of the computing device, to generate echo intensity (EI) data and B-mode data in parallel and in real-time. In some embodiments, an echo intensity processor 126 is configured to process the RF data in order to generate EI data while an image processor 124 is configured to concurrently process the RF data in order to generate B-mode data. It should be appreciated that in some embodiments, the echo intensity and image processors 126, 124 are standalone physical processors or digital signal processors (in addition to the at least one general-purpose physical processor 106) while in alternate embodiments the echo intensity and image processors 126, 124 are software engines, modules or applications representative of processes being executed, in parallel, on the general-purpose physical processor 106. In embodiments, the RF data is further processed and compressed to generate different types of ultrasound images optimized for visual inspection. Thus, probe 102 is configured to direct ultrasound radiation, and to receive ultrasound reflections, to generate data indicative of an anatomical region within a patient 114, thereby providing to a physician clinical information about various parts of the patient's body.

Computing device 104 may be fixed or portable. In various embodiments, the computing device 104 further comprises at least one non-transitory memory 108; one or more input devices 112 (such as, but not limited to, a keyboard, mouse, touch-screen, camera, and combinations thereof) that enable a user to interface with computing device 104; and one or more output devices 110 (such as, but not limited to, display screens, printers, speakers and combinations thereof) all of which may be stand-alone, integrated into a single unit, partially or completely network-based or cloud-based, and not necessarily located in a single physical location. In an embodiment, computing device 104 may also be in data communication with one or more databases that may be co-located with computing device 104 or located remotely, such as, for example, on a server. A multitude of parameters may be adjusted or configured by a user of the system or scanner 100 through the interface provided by input device 112 of the computing device 104. Computing device 104 is configured to store and execute a plurality of programmatic instructions in accordance with the embodiments of the present specification. It should be appreciated that all methods, processes, analyses, or steps disclosed in this specification are performed using the plurality of programmatic instructions stored in non-transient memory and executed by one or more processors in one or more computing devices 104.

FIG. 2A is a flow chart illustrating an exemplary process of generating analytical data corresponding to an ultrasound examination of a patient, in accordance with some embodiments of the present specification. The analytical data encompasses RF data, echo intensity data, and may include an analysis of a combination of the RF data. Referring simultaneously to FIGS. 1 and 2A, at step 202, B-mode data and RF data (including echo intensity data) collected by probe 102 is received by computing device 104. In some embodiments, the B-mode and RF data received is stored in memory 108. The received RF data includes data representative of echo intensity data corresponding to regions of interest (of the patient) targeted by probe 102.

At step 204, processor 106 is configured to analyze the received B-mode and RF data in order to generate analytical data corresponding to the entire B-mode and RF data and/or corresponding to a user-defined region of interest within the B-mode image. In various embodiments, the data analyzed is either the data collected by probe 102 in real time, stored data that was historically recorded, or a combination of both. In embodiments, the analytical data generated by processor 106 is stored for further clinical evaluation. In some embodiments, the user may retrieve the stored analytical data, acquire analytical data representative of similar anatomy and/or similar potential disease conditions related to the patient being examined, and compare the stored, retrieved analytical data to said similar analytical data in order to observe progression of pathology over a period of time or to obtain reference values, among other applications of historical analytical data. The RF data and/or analytical data of an entire ultrasound image is stored with native cine and image format for post examination analysis.

In various embodiments, analytical data comprises at least one of the following data corresponding to B-mode image/ultrasound image or a region of interest selected or marked in the B-mode image/ultrasound image: minimum, maximum, average, mean, median, histogram and standard deviation of echo intensity data, numerical/quantified value and graphical/waveform representations of echo intensity, depth of a top of a region of interest from a surface of skin, thickness of an anatomy marked in the B-mode image/ultrasound image, echo texture data (including quantification of entropy and cross correlation and RF histogram) for quantifying muscle or nerve architecture, a report that includes details gathered from an ultrasound examination, echogenicity of an anatomy (such as, for example, a muscle or nerve), overall area of a nerve and echo ratio parameters (the ratio of hypo-echoic areas to hyper-echoic areas) of the nerve, negative or positive peak ratio calculated based on hyper-versus hypo-echoic areas.

At step 206, the generated analytical data is presented/displayed, in at least one graphical user interface (GUI), in icon/graphics, graphical and/or numerical formats on output device 110. In some embodiments, additional information is presented/displayed in the at least one GUI wherein the additional information may include user-defined region of interest and/or B-mode image.

At step 208, the user may adjust an angle of probe 102 and/or the information (including analytical data, region of interest and/or B-mode image) displayed in the graphical user interface (displayed by output device 110) through one or more input devices 112. The adjustments may be provided by the user during the ultrasound examination, so that the displayed analytical data is modified and yield optimal results for the user. Some adjustments may also be provided subsequently post examination, during a review. In an exemplary non-limiting embodiment, the adjustments may include modifying a target area or region of interest. In embodiments, the user is enabled to mark one or more structures or portions in a single frame of a B-mode image, which may be a live image or a recorded image, for RF analysis. The user may mark one or more portions (also referred to as 'regions of interest') in the B-mode image with a graphical marking tool, integrated into the at least one GUI, that provides the user with an ability to create one of a plurality of types of traces or markers such as, but not limited to, a box, ellipse, circle or any other shape as would be evident to persons of ordinary skill in the art.

Figure 2B:
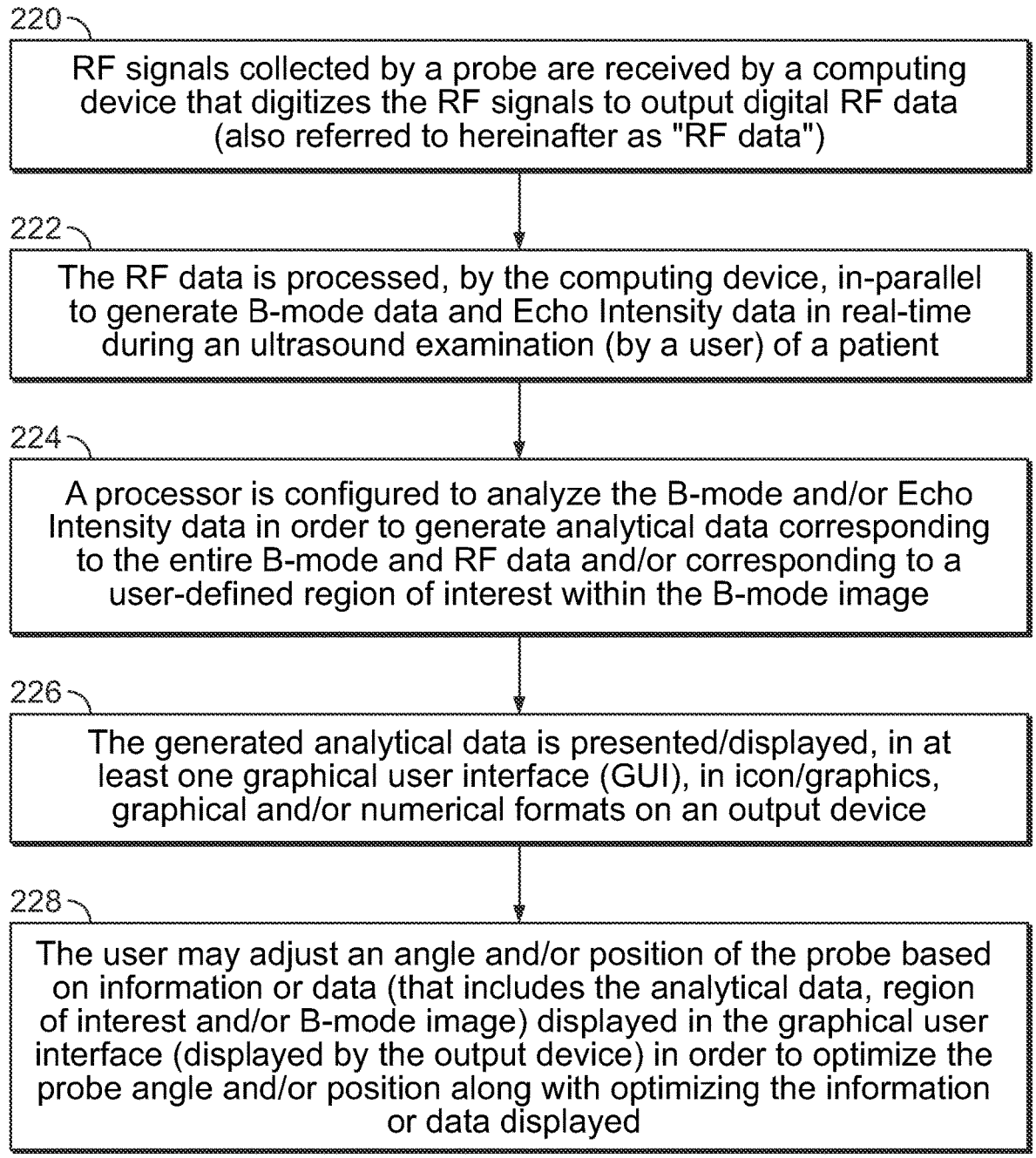
FIG. 2B is a flow chart illustrating another exemplary process of generating analytical data corresponding to an ultrasound examination of a patient, in accordance with some embodiments of the present specification.

FIG. 2B is a flow chart illustrating another exemplary process of generating analytical data corresponding to an ultrasound examination of a patient, in accordance with some embodiments of the present specification. In various embodiments, the analytical data encompasses RF data, echo intensity data, B-mode data as well as various measurements, parameters, characteristics or features that may be a function of one or more of the RF data, echo intensity data and B-mode data. Referring simultaneously to FIGS. 1 and 2B, at step 220, RF signals collected by probe 102 are received by computing device 104 that digitizes the RF signals to output digital RF data (also referred to hereinafter as "RF data"). In some embodiments, the RF data is stored in memory 108. In some embodiments, the RF data corresponds to regions of interest (of the patient) targeted by probe 102.

At step 222, the RF data is processed, by the computing device 104, in-parallel to generate B-mode data and Echo Intensity data in real-time during the ultrasound examination of the patient. In some embodiments, the image processor 124 is configured to process the RF data in order to generate B-mode data and the Echo Intensity processor 126 is configured to process, in-parallel, the RF data in order to generate Echo Intensity data. In some embodiments, the processors 124, 126 are standalone physical processing elements such as, for example, digital signal processors. Alternatively, in some embodiments, the processors 124, 126 are representatives of software modules, engines or applications comprising a plurality of programmatic instructions or code executed on the general-purpose processor 106.

In embodiments, the B-mode data is rendered (during examination of the patient) as B-mode image on output device 110. During examination (or post examination) this image is filtered and/or manipulated in different ways to enhance specific characteristics, parameters or features of the image, such as contrast, brightness, speckle reduction, and edge enhancement.

At step 224, processor 106 is configured to analyze the B-mode and/or Echo Intensity data in order to generate analytical data corresponding to the entire B-mode and RF data and/or corresponding to a user-defined region of interest within the B-mode image. In some embodiments, the analytical data is generated in real-time during the ultrasound examination of the patient. In various embodiments, the data analyzed is either the data collected by probe 102 in real-time, stored data that was historically recorded, or a combination of both. In embodiments, the analytical data generated by processor 106 is stored for further clinical evaluation. In some embodiments, a user may retrieve the stored analytical data, acquire analytical data representative of similar anatomy and/or similar potential disease conditions related to the patient being examined, and compare the stored, retrieved analytical data to said similar analytical data in order to observe progression of pathology over a period of time or to obtain reference values, among other applications of historical analytical data. The RF data, B-mode data, Echo Intensity data and/or analytical data of an entire ultrasound image is stored with native cine and image format for post examination analysis.

In various embodiments, analytical data comprises at least one of the following data corresponding to B-mode image/ultrasound image or a region of interest selected or marked in the B-mode image/ultrasound image: minimum, maximum, average, mean, median, histogram and standard deviation of echo intensity data, numerical/quantified value and graphical/waveform representations of echo intensity, depth of a top of a region of interest from a surface of skin, thickness of an anatomy marked in the B-mode image/ultrasound image, echo texture data (including quantification of entropy and cross correlation and RF histogram) for quantifying muscle or nerve architecture, a report that includes details gathered from an ultrasound examination, echogenicity of an anatomy (such as, for example, a muscle or nerve), overall area of a nerve and echo ratio parameters (the ratio of hypo-echoic areas to hyper-echoic areas) of the nerve, negative or positive peak ratio calculated based on hyper-versus hypo-echoic areas.

At step 226, the generated analytical data is presented/displayed, in at least one graphical user interface (GUI), in icon/graphics, graphical and/or numerical formats on output device 110. In some embodiments, additional information is presented/displayed in the at least one GUI wherein the additional information may include user-defined region of interest and/or B-mode image.

At step 228, the user may adjust an angle and/or position of probe 102 based on the information or data (that includes the analytical data, region of interest and/or B-mode image) displayed in the graphical user interface (displayed by output device 110) in order to optimize the probe angle and/or position along with optimizing the information or data displayed. The adjustments may be provided by the user during the ultrasound examination, so that the displayed analytical data is modified and yield optimal results for the user. Some adjustments may also be provided subsequently post examination, during a review. In an exemplary non-limiting embodiment, the adjustments may include modifying a target area or region of interest. In embodiments, the user is enabled to mark one or more structures or portions in a single frame of a B-mode image, which may be a live image or a recorded image, for RF analysis. The user may mark one or more portions (also referred to as 'regions of interest') in the B-mode image with a graphical marking tool, integrated into the at least one GUI, that provides the user with an ability to create one of a plurality of types of traces or markers such as, but not limited to, a box, ellipse, circle or any other shape as would be evident to persons of ordinary skill in the art.

Thus, by processing the RF data directly, the Echo Intensity data can be generated continuously during the examination and with a much higher accuracy and consistency across different probes, depth to measured anatomy, and different types of overlaying tissue. The processed Echo Intensity data and analytical data are immediately available to the clinician allowing him/her to optimize the probe angle and position.

Figure 3:
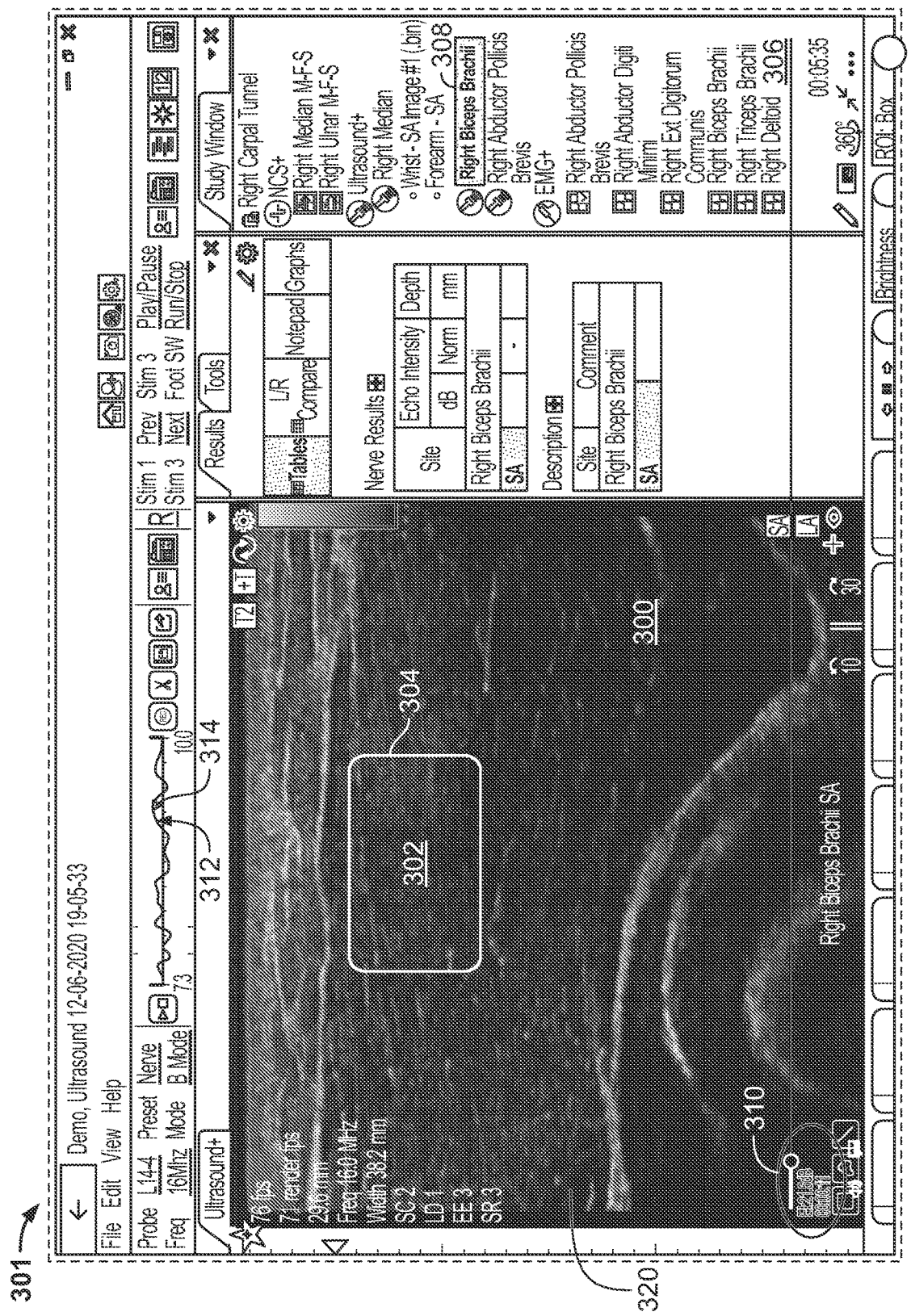
FIG. 3 is a screenshot of a graphical user interface (GUI), generated by the computing device, displaying a first exemplary image captured by a probe, in accordance with some embodiments of the present specification.

FIG. 3 illustrates a screenshot of a graphical user interface (GUI) 301, generated by the computing device 104, displaying an exemplary image 300 captured by probe 102, in accordance with some embodiments of the present specification. A region of interest 302, in the image 300, is marked by a user through a graphical box 304. As described previously, the region of interest may be marked by one of a plurality of types of traces or markers. The user may select a preferred marker type from a graphical marking too integrated into the graphical user interface 301. The GUI 301 also illustrates additional options that are presented to the user. The illustrated options and images shown in FIG. 3 are exemplary only. A study window or portion 306 on a right side of the GUI 301 lists a plurality of anatomies that may have been reviewed or examined. For example, image 300 corresponds to right biceps brachii 308, with is a muscle area in a right arm of a patient. Selected anatomy (right biceps brachii) 308 is highlighted in the GUI 301.

During use, the user may first select an anatomy 308 (in this case, for example, the right biceps brachii) as a result of which the image 300, corresponding to the selected anatomy 308, is displayed in a study window 320. Thereafter, the region of interest 302 in image 300 is marked using a mark such as, for example, a box 304. A region of interest 302 may be adjusted with an input device, such as movement of a mouse or a touchpad, or a touch-enabled interface provided within the display. In embodiments, the region or interest 302 is adjusted during the ultrasound examination or may be adjusted post examination during a review. In some embodiments, the region of interest 302 is adjusted to encompass a region or portion within the image 300 where echo intensity has the maximum value. Once the desired region of interest 302 is identified and marked, the region of interest 302 is stored for subsequent review. Therefore, embodiments of the present specification offer an ability to select a region of interest with a trace or mark of a desired shape and size, based on an anatomy selected and/or the anatomy represented by the image 300.

In embodiments, echo intensity is recorded during the ultrasound examination. Echo intensity is the base output or measurement from the ultrasound device. The echo intensity measurement signal generated by the ultrasound device represents amount of sound reflected from specific points in the tissue that is being scanned. During a live examination, echo intensity is recorded periodically. The amount of reflected sound is represented in the form of a number that is repeatedly measured at a high repetition rate. In some embodiments, the repetition rate is within a range of 50 Hz to 100 Hz. In some embodiments, echo intensity is recorded every 2 seconds. In embodiments, live echo intensity is represented numerically and graphically, such as graph 312 in the GUI 301, and stored in a cine buffer so a user may find an optimal probe angle both during live scanning and in review.

Figure 5:
FIG. 5 is a flow chart illustrating an exemplary process implemented by the modules of FIG. 4, in accordance with some embodiments of the present specification.
Figure 4:
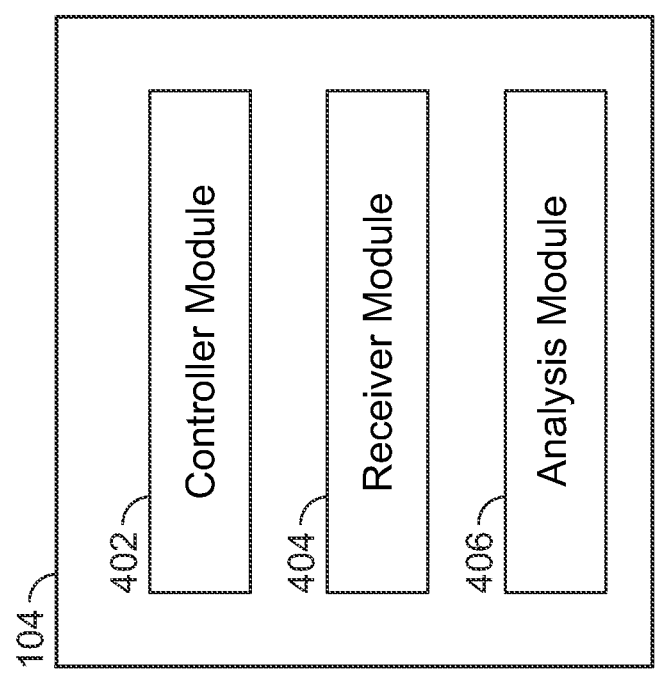
FIG. 4 is a block diagram showing an exemplary set of modules within a computing device that are configured to receive and analyze echo intensity measurements, in accordance with some embodiments of the present specification.

FIG. 4 illustrates an exemplary set of modules within computing device 104 that are configured to receive and analyze echo intensity measurements, in accordance with some embodiments of the present specification. FIG. 5 is a flow chart illustrating an exemplary process implemented by the modules of FIG. 4, in accordance with some embodiments of the present specification. Referring simultaneously to FIGS. 3, 4, and 5, at step 502, a controller module 402 is configured to repeatedly measure echo intensity data of a tissue area under observation during an ultrasound scan. As specified previously, the measurement is performed repeatedly with a frequency. The frequency may be pre-defined or user-specified, and is programmed within computing device 104. The measured echo intensity data, over a period of time, forms the basis of data that is analyzed in different ways to provide clinical information of interest. Typical clinical information of interest includes, but is not limited to, the absolute EI in a muscle, comparing EI results in the same muscle from the left and right side of the body, and measuring low vs. high EI proportions in a nerve cross section. The echo intensity data is calculated from the RF data in the embodiments of the present specification. The echo intensity data, from a region of interest (ROI) is mathematically processed, for example, to provide average, mean, and median, and tracked over time to form, for example, a waveform, such as waveform 312 in FIG. 3. RF data is stored by the system and may be processed at a later period of time to construct additional measurements and results. Echo intensity calculations are made directly from the RF data, rather than being derived from the B-mode images. Prior art systems do not provide access to the RF data but use only the B-mode images generated from the RF data to calculate EI.

The echo intensity data, for each pixel in image 300, is recorded over a period of time, and stored. In embodiments, the echo intensity data pixels are stored in a cine or video. In some embodiments, the RF data comprises a stream of numerical arrays over time. Each array, similar to a video frame, is used to construct a still B-mode image. A series of still images is then used to construct a video or cine. Numerical analysis of the ROI can be repeated for each numerical array over time, which can be used to generate a line graph, single number, video or representation most useful to a clinician.

At step 504, receiver module 404 receives image 300 scanned by the scanner and stores it in the cine. Module 404 also receives input from the user, through input device 112, indicative of a trace or mark of a region of interest (ROI) within image 300. At step 506, analysis module 406 analyzes the RF data received from the probe, the echo intensity results measured over a period of time and localized within the region of interest 302, in order to quantify different types of measures of echo intensity. In embodiments, the echo intensity data for the selected region of interest 304 may be represented as an average. In alternative embodiments, the echo intensity data for the selected region of interest 304 is quantified as a mean, or a median. The measures are presented in real time to the user during the ultrasound scanning. Data analyzed by analysis module 406 is displayed through one or more output devices 110.

The data analyzed by analysis module 406 may additionally identify a maximum, which is when the averaged echo intensity is at its highest value compared to previous points in time. Users may observe the screen for maximum echo intensity value during the examination. Once a point is identified where the echo intensity value is at its peak, or at least above a user-specified threshold, a user may consider a position and angle of probe 102 to be optimal and select to mark or record the image for further analysis. In embodiments, a user modifies a probe angle and/or position of the ultrasound probe to reach a position where echo intensity value is at a maximum. Therefore, embodiments of the present specification enable probe angle and/or position optimization during an ultrasound examination, avoiding a need for re-examination at a later time. Live feedback from echo intensity levels is used to achieve probe angle and/or position optimization.

In some embodiments, the live quantified value of echo intensity (EI) is displayed to the user as a visual icon or graphic 310 during the examination. In some embodiments, the displayed quantified EI 310 is highlighted, such as for example by change of color, when its value reaches a maximum. For example, in some embodiments, EI graphic or icon 310 functions similarly to a gas gauge, turning green when maximum echo intensity is reached, red when minimum echo intensity is reached, and yellow for values in between.

In some embodiments, the user is provided with an option to freeze image 300 during an examination. A line graph 312 of quantified EI values recorded over a period of time during the examination is displayed with image 300. The illustrated GUI 301 displays EI values in graph 312 from a time T1 (7.3) to time T2 (10), for region of interest 302. Graph 312 includes a marker 314 that is a point where EI value is the maximum between T1 and T2. User may click on marker 314 to view image 300 for that point in time where the recorded EI is shown to be at a maximum in graph 312. Numerical and graphical data during the examination enables the user to find the optimal probe angle and position. In embodiments, the numerical analysis of the echo intensity data is represented on a graph. Optionally, the X-axis of the graph represents time, while the Y-axis represents a numerical value of the echo intensity. Thus, in embodiments, the present specification presents a graph or chart with the X-axis representing a time and the Y-axis representing a numerical value of the echo intensity over time (thus a time variation of the echo intensity data), which, optionally, is linked to the recorded ultrasound images/movie/cine/video. It should be noted herein that the scales on the axes of the graph are representative of a set of numbers that measure or quantify an object or a set of objects under inspection. In embodiments, "scale" refers to the graphical and numerical representation of quantified echo intensity data.

Figure 6:
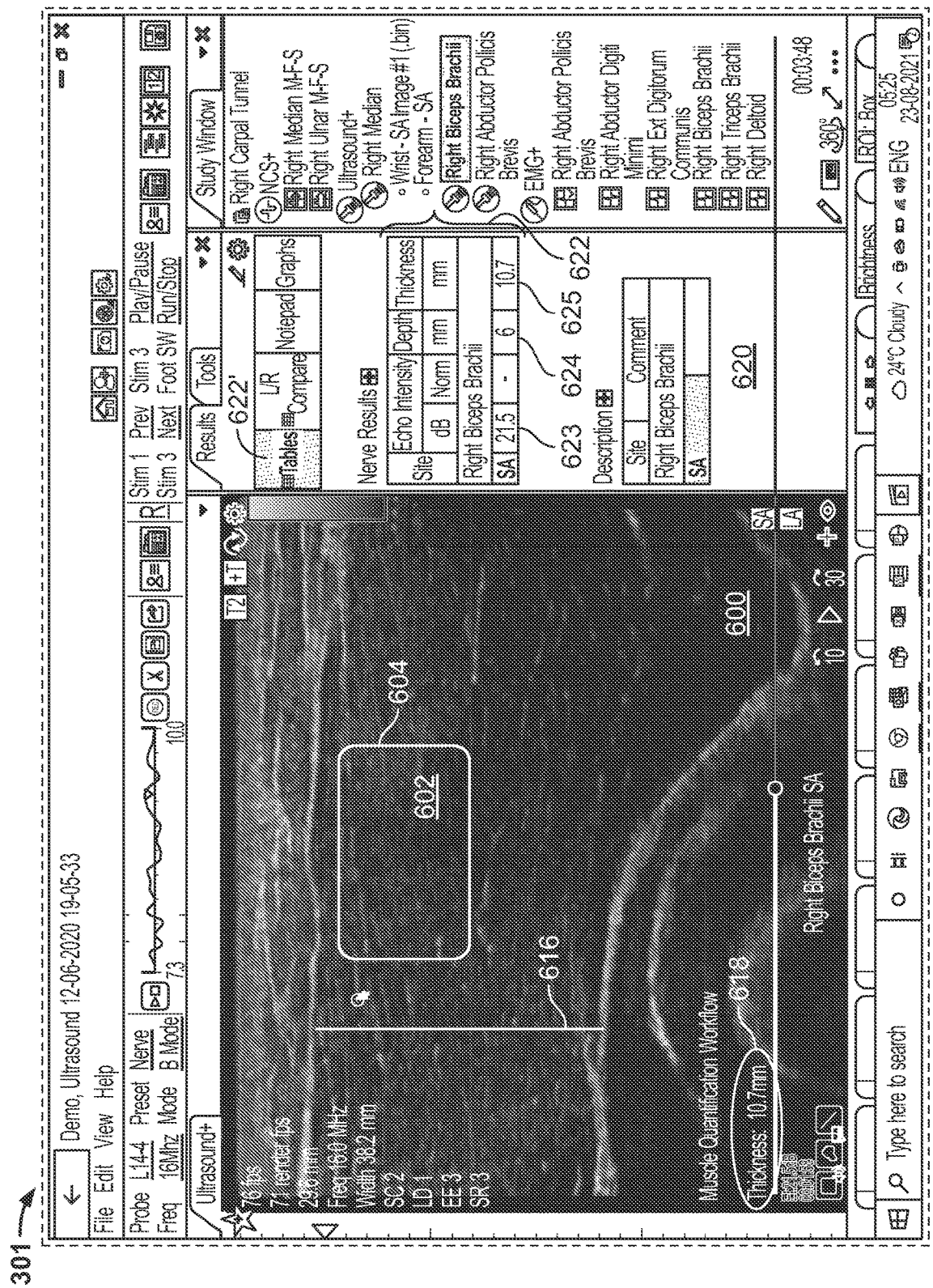
FIG. 6 is another screenshot of the graphical user interface (GUI) of FIG. 3, generated by the computing device, displaying a second exemplary image captured by probe, in accordance with some embodiments of the present specification.

FIG. 6 illustrates another screenshot of the graphical user interface (GUI) 301, generated by the computing device 104, displaying an exemplary image 600 captured by probe 102, in accordance with some embodiments of the present specification. The figure shows use of a line 616 that is drawn by the user using a line tool presented on the interface 301. User may mark line 616 from one point in image 600 to another to view a distance between the two points. Line 616, marked by the user, corresponds to a thickness 618 of muscle, which is illustrated along with image 600. The illustrated thickness is 170 millimeters (mm) for line 616. A study window 620 towards the central right side of the GUI 301 shows options from where the user can select to view tables, graphs, or any other form of data structure that is captured and analyzed by computing system 104. The screenshot of FIG. 6 illustrates a scenario where the user selects a 'table' visual tab or icon 622' in order to display a table 622 of data. In some embodiments, the table 622, illustrated in the figure, shows a mean echo intensity value 623 (of 21.5 dB) for a target area or region of interest (ROI) 602 that is marked by the user with a box 604, for example. Table 622 also illustrates a depth 624 in millimeters, which is the distance from surface of skin to the top of target area or region of interest 602, and thickness 625 measured by line 616. Additional statistical data may be added or removed based on the user's requirements. In embodiments, the computing device 104 is configured to refine the echo intensity measurements by compensating for gain, tissue above the region of interest, and/or depth setting of the region of interest for the ultrasound scanning system 100.

Figure 7:
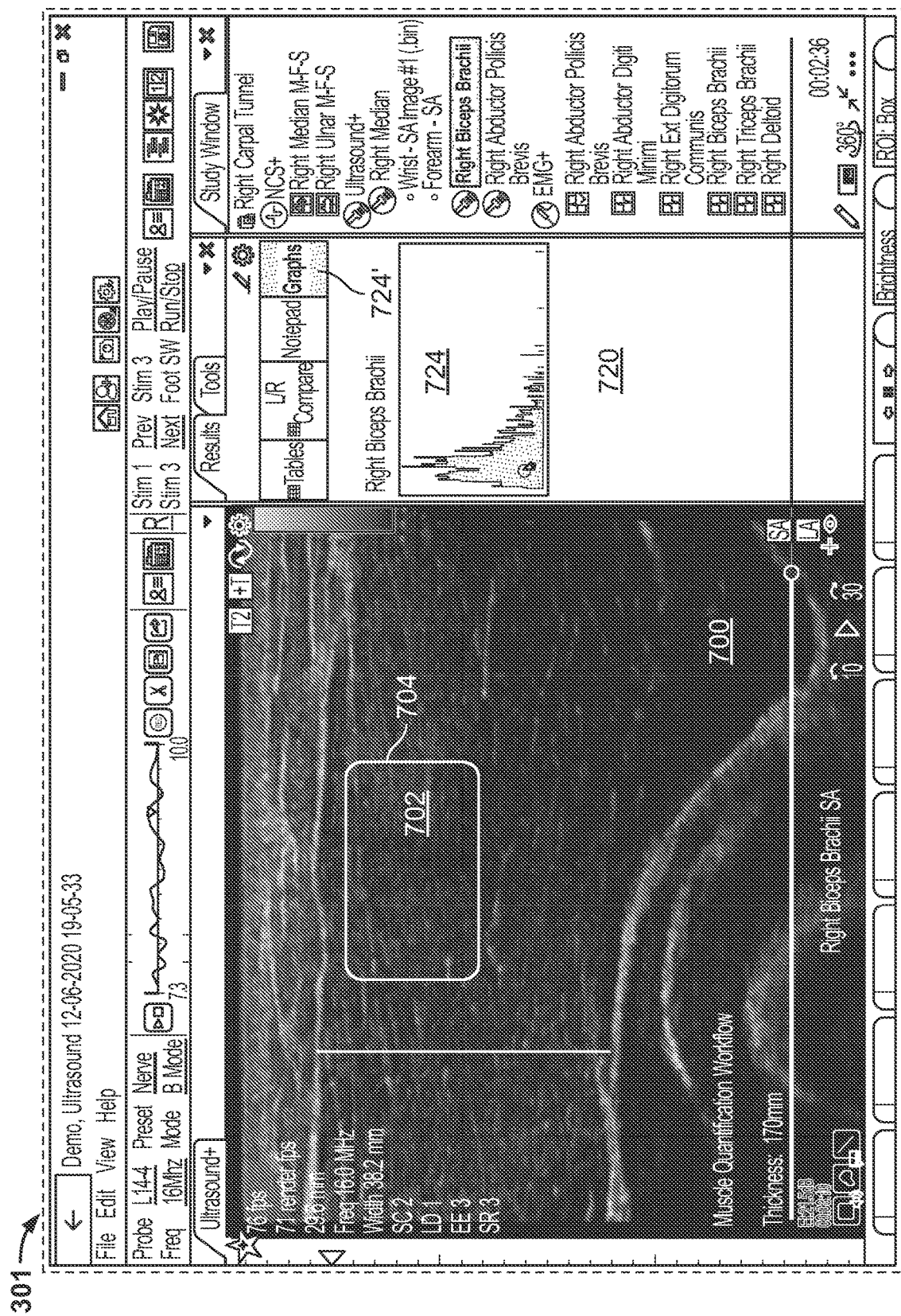
FIG. 7 is yet another screenshot of the graphical user interface (GUI) of FIG. 3, generated by the computing device, displaying a third exemplary image captured by probe, in accordance with some embodiments of the present specification.

FIG. 7 illustrates yet another screenshot of the graphical user interface (GUI) 301, generated by the computing device, displaying an exemplary image 700 captured by probe 102, in accordance with some embodiments of the present specification. The screenshot of FIG. 7 illustrates a scenario where the user selects a 'graph' visual tab or icon 724' in order to display a graph 724 that is presented within a study window 720. Graph 724 represents mean echo intensity within a target area 702 marked by the user using a box 704, for example. In various embodiments, graph 724 may include representation of one or more of minimum, maximum, mean, media, and standard deviation, of the recorded echo intensity values for the selected anatomy (in this case, right biceps brachii).

In embodiments, the user may opt to view one or more of types of data analyzed from the ultrasound images. The data to be displayed in the GUI 301 is customizable by the user based on the requirement for corresponding pathological assessment. The options may include echo intensity related data, such as and not limited to maximum value, minimum value, mean value, and histogram, which may be associated with a target area. For nerve quantification, the GUI 301 may include echo ratio parameters, which are described in detail in the following portions of the present specification. The GUI 301 may also illustrate echo texture for quantifying muscle or nerve architecture. The echo texture data may include quantification of entropy and cross correlation and RF histogram. The GUI 301 may offer an option to the user to show a grid of an entire image or marked structure with echo intensity measurement of each section of the grid.

The user is provided with an option to generate a report that includes details gathered from an ultrasound examination. The report may include, among other details, date and duration of examination, data analytics such as minimum, maximum, and mean echo intensity values, and/or images showing a target area marked by the user where the mean echo intensity value is maximum.

During the examination, user may alter image related parameters for convenience. These parameters might include image brightness, image contrast, depth setting, speckle reduction, edge enhancement, gamma, and Bitmap, which do not affect analysis of echo intensity data. However, certain parameters that may affect RF data and therefore the analysis are locked and cannot be modified by the user. The locked parameters may include size of a region of interest, probe frequency, number of focal points and focus depth, beam count and beam angle, image steering, harmonics, aperture, and crystal count and position.

Ultrasound image data gathered and analyzed by components of the present specification are compensated for some parameters, such as and not limited to time gain compensation corresponding to changes in echo-amplitude caused by variations in beam formation along the beam axis and by absorption. Therefore, speed of sound calculation is compensated for fat versus muscle. Another parameter that is compensated is tissue depth or depth of the region of interest from surface of the skin, which mostly includes fat. Compensation algorithms may be included in the computing system to allow for more accurate comparison with other ultrasound examinations. Compensation algorithms may also compensate for depth settings of an image, focal points and location of the image, probe frequency, and spatial compounding.

By presenting real-time ultrasound echo intensity and related quantifiable analytics, including graphical feedback, to a user during a neuromuscular ultrasound scan, the user is able to make live adjustments to the probe angle, ensuring an optimal probe angle and target area and further ensuring that the data is reproducible and comparable to contralateral extremities and reference data. Further, by providing live RF data and feedback on echo intensity, a user can rapidly assess the health of nerves and muscles and make dynamic decisions on what other electrodiagnostic exams may be required during the same patient visit instead having to schedule a follow-up visit for future studies, leading to more timely and accurate diagnoses. Additionally, the systems and methods of the present specification provide clinicians the ability to efficiently collect reproducible normative data for comparison and research advancements. Utilizing live, real-time echo intensity derived from RF data allows users to target a muscle for study, adjust a probe angle based on feedback, and display and collect the live data for comparison of other muscles or contralateral anatomies.

Figure 8:
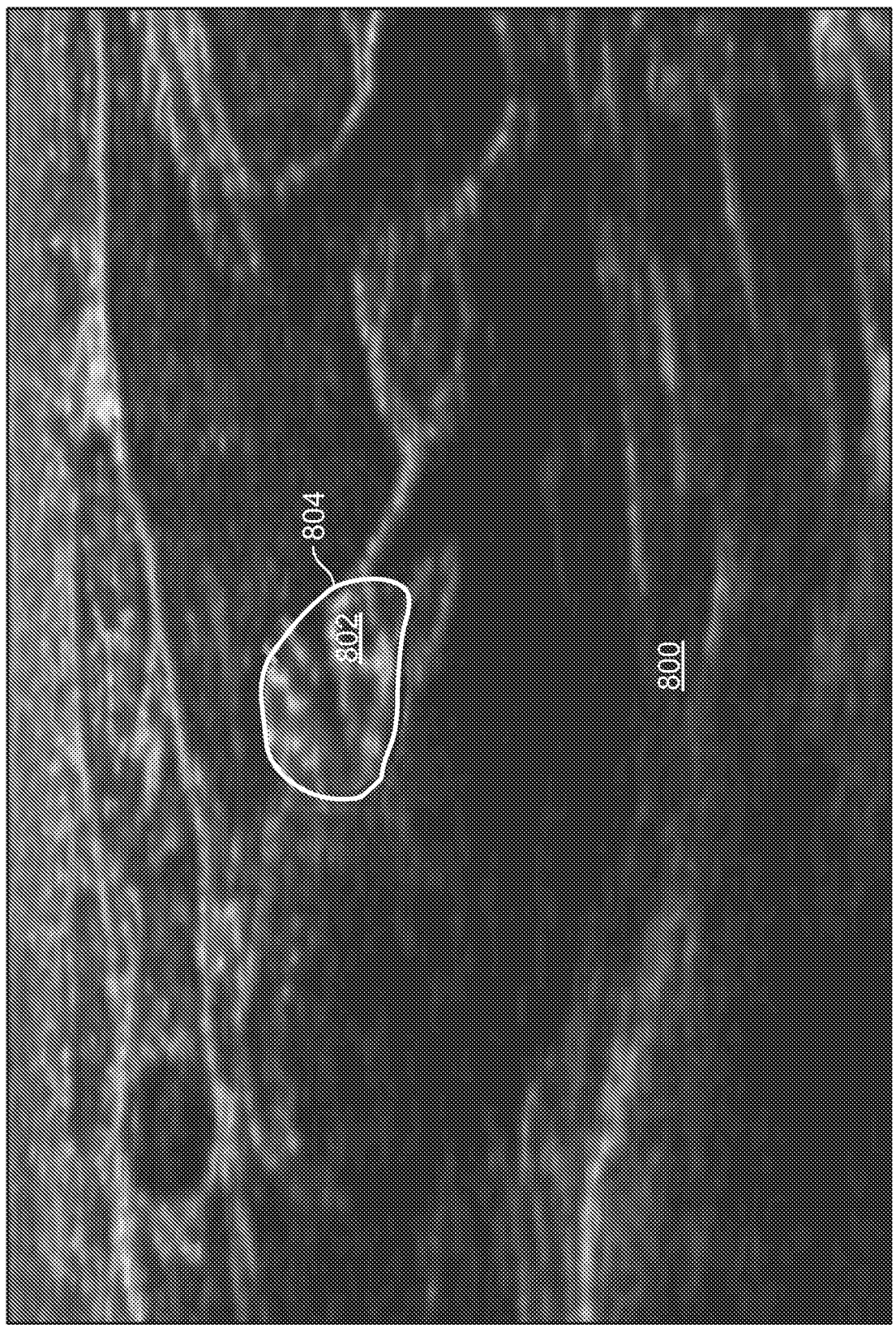
FIG. 8 is an exemplary image for nerve quantification, in accordance with some embodiments of the present specification.

While the various embodiments of the present specification are described for muscle quantification, they can also be used for nerve quantification. System 100 uses RF data to measure echogenicity of a muscle or nerve structure in real-time. In embodiments of nerve quantification, RF data is used to derive, among others, the overall area of a nerve and the ratio of hypo-echoic areas to hyper-echoic areas of the nerve (using an RF histogram) to determine nerve health. In some embodiments, the ratio of hypo-echoic to hyper-echoic area is termed as echo ratio and is optionally displayed to the user as a percentage. The echo ratio is indicative of nerve and muscle health. In some embodiments, a negative or positive peak ratio is calculated based on hyper-versus hypo-echoic areas and used to determine nerve health. FIG. 8 is an exemplary image 800 for nerve quantification, in accordance with some embodiments of the present specification. A target area or ROI 802 is marked using an enclosure, trace or mark 804 that is drawn by the user with a marking tool. In some embodiments, the computing system 104 is configured to measure area enclosed by enclosure, trace or mark 804 and display, to the user, the data indicative of the measured area. It should be appreciated that when a nerve is compressed it will swell and that will be captured by measuring the area (enclosed by enclosure, trace or mark 804) of the nerve. It is also of interest to measure the relation between dark (hypo echoic) and light (hyper echoic) area ratio.

The above examples are merely illustrative of the many applications of the system and method of present specification. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

What is claimed is:

1. A computer-implemented method for conducting an ultrasound scan of a patient, the method being implemented in a computer having a processor and a memory, wherein the processor is in data communication with an ultrasound probe, a display and a storage unit and is configured to execute a plurality of programmatic instructions, the method comprising:
   receiving RF signals from the ultrasound probe;
   generating digital RF data from the received RF signals;
   during the ultrasound scan of the patient, generating B-mode data by processing the digital RF data;
   in parallel to generating the B-mode data, generating echo intensity data of a region of interest directly from the digital RF data;
   generating analytical data based on at least one of the B-mode data and the echo intensity data;
   generating at least one graphical interface; and
   presenting the echo intensity data in the at least one graphical interface during the ultrasound scan to enable a real-time adjustment of the probe position.

2. The computer-implemented method of claim 1, further comprising measuring the echo intensity data at a customizable frequency.

3. The computer-implemented method of claim 1, further comprising presenting the echo intensity data both numerically and graphically in the at least one graphical interface, wherein presenting the echo intensity graphically comprises presenting the echo intensity as an icon or in the form of a graph.

4. The computer-implemented method of claim 1, further comprising storing the RF data in a numerical array and processing the echo intensity data directly from the numerical array to generate at least one of an average value, a mean value and/or a median value.

5. The computer-implemented method of claim 1, further comprising enabling a user to adjust an angle and/or position of the ultrasound probe in order to optimize the display data.

6. The computer-implemented method of claim 1, wherein the at least one graphical interface comprises a third window, wherein the third window is configured to display a table data structure and a graph data structure, and wherein the table data structure comprises a mean echo intensity value for the region of interest, a depth from a surface of the patient's skin to the region of interest and a thickness of an anatomy.

7. The computer-implemented method of claim 1, wherein the at least one graphical interface comprises a third window, wherein the third window is configured to display a table data structure and a graph data structure, and wherein the graph data structure comprises at least one of a minimum, maximum, mean, median or standard deviation of the echo intensity corresponding to the region of interest.

8. The computer-implemented method of claim 1, wherein the at least one graphical user interface has a first window that displays one or more anatomies of the patient for which the ultrasound scan is performed, and wherein the method further comprises enabling a user to select an anatomy from the one or more anatomies and wherein, upon selecting said anatomy, causing the B-mode data corresponding to the selected anatomy to be displayed in a second window of the at least one graphical interface.

9. The computer-implemented method of claim 8, further comprising enabling the user to mark the region of interest on the at least one graphical interface using a graphical marking tool integrated into the at least one graphical interface.

10. The computer-implemented method of claim 9, further comprising enabling the user to adjust the region of interest to encompass a portion within the display data, wherein the portion has a maximum value of the echo intensity data.

11. A system for evaluating one or more ultrasound scans of a patient, wherein the system includes a computer having a processor and a random access memory, wherein the processor is in data communication with an ultrasound probe, a display and a storage unit, and wherein the storage unit stores a plurality of programmatic instructions which when executed by the processor cause the processor to:
receive RF signals from the ultrasound probe;
generate digital RF data from the received RF signals;
during the ultrasound scan of the patient, generate B-mode data by processing the digital RF data;
in parallel to generating the B-mode data, generate echo intensity data of a region of interest directly from the digital RF data;
generate analytical data based on at least one of the B-mode data and the echo intensity data;
generate at least one graphical interface; and
present the echo intensity data in the at least one graphical interface during the ultrasound scan to enable a real-time adjustment of the probe position.

12. The system of claim 11, further comprising a plurality of programmatic instructions which when executed by the processor cause the processor to measure the echo intensity data at a customizable frequency.

13. The system of claim 11, further comprising a plurality of programmatic instructions which when executed by the processor cause the processor to present the echo intensity data numerically and/or graphically in the at least one graphical interface as an icon or in the form of a graph.

14. The system of claim 11, further comprising a plurality of programmatic instructions which when executed by the processor cause the processor to process the echo intensity data directly from a numerical array to generate at least one of an average value, a mean value and a median value.

15. The system of claim 11, further comprising a plurality of programmatic instructions which when executed by the processor cause the processor to generate a first window in the at least one graphical interface, wherein the first window is configured to display one or more anatomies for which ultrasound scans were performed, to receive a selection of a specific one of the one or more anatomies, and to cause an ultrasound image corresponding to the selected specific one of the one or more anatomies to be displayed in a second window of the at least one graphical interface.

16. The system of claim 15, further comprising a plurality of programmatic instructions which when executed by the processor cause the processor to enable the user to mark the region of interest on the ultrasound image using a graphical marking tool integrated into the at least one graphical interface.

17. The system of claim 16, further comprising a plurality of programmatic instructions which when executed by the processor cause the processor to adjust the region of interest to encompass a portion within the ultrasound image, and wherein the portion has a maximum value of the echo intensity data.

18. The system of claim 11, further comprising a plurality of programmatic instructions which when executed by the processor cause the processor to generate a third window in the at least one graphical interface, wherein the third window is configured to display of options, and wherein the options include a display of a table data structure and a display of a graph data structure.

19. The system of claim 18, wherein the table data structure comprises a mean echo intensity value for the region of interest, a depth from surface of patient's skin to the region of interest and a thickness of an anatomy.

20. The system of claim 18, wherein the graph data structure comprises at least one of a minimum, maximum, mean, media and standard deviation of the echo intensity data corresponding to the region of interest.

\* \* \* \* \*